US008560970B2

(12) United States Patent
Liddington

(10) Patent No.: US 8,560,970 B2
(45) Date of Patent: Oct. 15, 2013

(54) HIERARCHICAL TAG BASED BROWSING OF MEDIA COLLECTIONS

(75) Inventor: Simon Liddington, Drummoyne (AU)

(73) Assignee: Canon Kabushiki Kaisha, Tokyo (JP)

( * ) Notice: Subject to any disclaimer, the term of this patent is extended or adjusted under 35 U.S.C. 154(b) by 947 days.

(21) Appl. No.: 12/324,780

(22) Filed: Nov. 26, 2008

(65) Prior Publication Data

US 2009/0164946 A1      Jun. 25, 2009

(30) Foreign Application Priority Data

Dec. 20, 2007   (AU) ................................ 2007254603

(51) Int. Cl.
*G06F 3/048*   (2013.01)
(52) U.S. Cl.
USPC .......................................................... 715/853
(58) Field of Classification Search
USPC .......................................................... 715/853
See application file for complete search history.

(56) References Cited

U.S. PATENT DOCUMENTS

| | | | | |
|---|---|---|---|---|
| 6,317,761 | B1 * | 11/2001 | Landsman et al. ............ | 715/205 |
| 6,558,431 | B1 * | 5/2003 | Lynch et al. .................. | 715/210 |
| 6,886,130 | B1 * | 4/2005 | Unger et al. .................. | 715/207 |
| 7,162,488 | B2 * | 1/2007 | DeVorchik et al. ............... | 1/1 |
| 2002/0107829 | A1 * | 8/2002 | Sigurjonsson et al. ........... | 707/1 |
| 2005/0138570 | A1 * | 6/2005 | Good et al. .................... | 715/789 |
| 2006/0085765 | A1 * | 4/2006 | Peterson et al. ............... | 715/853 |
| 2006/0173985 | A1 * | 8/2006 | Moore .......................... | 709/223 |
| 2006/0195461 | A1 * | 8/2006 | Lo et al. ....................... | 707/100 |
| 2009/0319472 | A1 * | 12/2009 | Jain et al. ......................... | 707/2 |

OTHER PUBLICATIONS

"Tag Your digital Photographs", http://web.archive.org/web/2006061619303/digicamguides.com/store/photo-tag.html, published on Jun. 16, 2006 as per Wayback Engine (retrieved on Feb. 15, 2010).
Australian Examination Report dated Feb. 18, 2010 in corresponding Australian Application No. 2007254603.

* cited by examiner

*Primary Examiner* — Omar Abdul-Ali
*Assistant Examiner* — Anil Bhargava
(74) *Attorney, Agent, or Firm* — Fitzpatrick, Cella, Harper & Scinto

(57) ABSTRACT

A method of browsing a plurality of media items is disclosed. At least one of the media items being associated with a plurality of tag values, each tag value having a level. The method constructs a hierarchical tree structure of tag values according to the levels of the tag values, such that any tag value on any branch of the tree structure from a first tag value is associated with a media item with which said first tag value is associated. At least a first portion of the constructed tree structure is displayed in a graphical user interface. User input is detected to change the level of a second tag value in the displayed portion. The tree structure is reconstructed according to the changed levels of the tag values, such that any tag value on any branch from a third tag value remains associated with a media item with which said third tag value is associated. At least a second portion of the reconstructed tree structure is then displayed in the graphical user interface.

18 Claims, 14 Drawing Sheets

HIERARCHICAL TAG BASED BROWSING OF MEDIA COLLECTIONS

CROSS-REFERENCE TO RELATED PATENT APPLICATIONS

This application claims the right of priority under 35 U.S.C. §119 based on Australian Patent Application No. 2007254603, filed Dec. 20, 2007, which is incorporated by reference herein in its entirety as if fully set forth herein.

TECHNICAL FIELD

The current invention relates to digital storage and management of media items and, in particular, to an application for organising and browsing a large collection of media items in an environment where the user input device is limited (e.g. a TV remote control) and a relatively simple user interface is desirable.

BACKGROUND

There are many computer applications and file sharing websites where the user can add tags or keywords to media items of interest. These mostly work on a flat structure of tags. In this regard, the user can access media items using a browser application by choosing a tag from a list of available tags and then view the set of items with the chosen tag. Such arrangements however have no hierarchy of tags. For large collections with a large number of tags it becomes difficult to manage and browse the available tags.

A few applications designed as professional image management applications, allow the user to organise their tags into a hierarchy or tree structure using drag-and-drop techniques in a manner common to many computer applications. The computer applications are exclusively configured to operate on desktop or substantive computer systems when substantial user control (via keyboard and mouse/pointer for example), graphical display and underlying computer processing power, are available. A drag-and-drop interface is not suited to domestic "living room" environments where a user controllable input device is typically a handheld remote control input device having a limited keypad, and the visual interface, such as a television display, may not be configured for high resolution graphical reproduction.

In an application aimed at professional use in a personal computer environment it is acceptable for the user to have to learn the operational controls and behaviour of the application. However, for the living room environment it is important any user interface be simple and intuitive to use. In the drag-and-drop interface previously described, it can be ambiguous to the user when moving a tag below another tag in the hierarchy what this association of the two tags implies. The association could imply that files tagged with the lower level tag now automatically or implicitly have the higher level tag. Alternatively the association could imply that the browser application will only display items which have both tags when the lower level tag is selected. Other interpretations are also possible.

Another known solution to the problem of providing some organisational structure to a collection of tags is to allow the user to name a group of tags. However these tag groups are not tags themselves. The two concepts of tags and tag groups are independent and the user cannot make a tag into a tag group or vice versa. An item cannot be added to a tag group directly; it must be tagged with a tag in the group. This system does not take advantage of the fact that some tags are more general and some tags more specific. More general tags naturally reside higher in the hierarchy than more specific tags, and more general tags are likely to be found on a larger number of items than specific tags.

SUMMARY

It is an object of the present invention to substantially overcome or at least ameliorate one or more deficiencies of prior arrangements. Preferred implementations of the arrangements described herein provide for simple and unambiguous user control of hierarchical tags.

In accordance with one aspect of the present invention, there is disclosed a method of browsing a plurality of media items, at least one of said media items being associated with a plurality of tag values, each tag value having a level, the method comprising the steps of:

(a) constructing a hierarchical tree structure of tag values according to the levels of the tag values, such that any tag value on any branch of the tree structure from a first tag value is associated with a media item with which said first tag value is associated;

(b) displaying at least a first portion of the constructed tree structure in a graphical user interface;

(c) changing, in response to a user input, the level of a second tag value in the displayed portion;

(d) reconstructing the tree structure according to the changed levels of the tag values, such that any tag value on any branch from a third tag value remains associated with a media item with which said third tag value is associated; and (e) displaying at least a second portion of the reconstructed tree structure in the graphical user interface.

In accordance with another aspect of the present disclosure there is provided a method of browsing a plurality of media items, at least one of said media items being associated with a plurality of tag values, each tag value having a level, the method comprising the steps of:

(a) constructing an organisational structure of tag values such that if a media item is associated with a first tag and a second tag, and said first tag has a higher level than said second tag, a relationship is created between said first and second tags;

(b) displaying at least a first portion of the constructed structure in a graphical user interface;

(c) changing, in response to a user input, the level of a third tag value;

(d) reconstructing the organizational structure such that if a media item is associated with each of a fourth tag and a fifth tag, and said fourth tag has a higher level than said fifth tag, a relationship is created between said fourth tag and said fifth tag; and (e) displaying at least a second portion of the reconstructed structure in the graphical user interface.

Other aspects are also disclosed.

BRIEF DESCRIPTION OF THE DRAWINGS

At least one embodiment of the present invention will now be described with reference to the following drawings, in which.

DETAILED DESCRIPTION INCLUDING BEST MODE

The present disclosure provides for a media item browser application (simply a "browser") to incorporate a tag tree, to enable efficient browsing of tags and media items, which is simple to establish and manage by the user through a limited input device, such as a TV remote control. The arrangements described achieve this by automatically generating the tag tree from a set of rules based on levels assigned to each tag value. Each tag value only appears in the tree at the level to which it is assigned. The user can then adjust the levels assigned to tag values and the tag tree is automatically reconstructed according to the rules.

Figure 8:
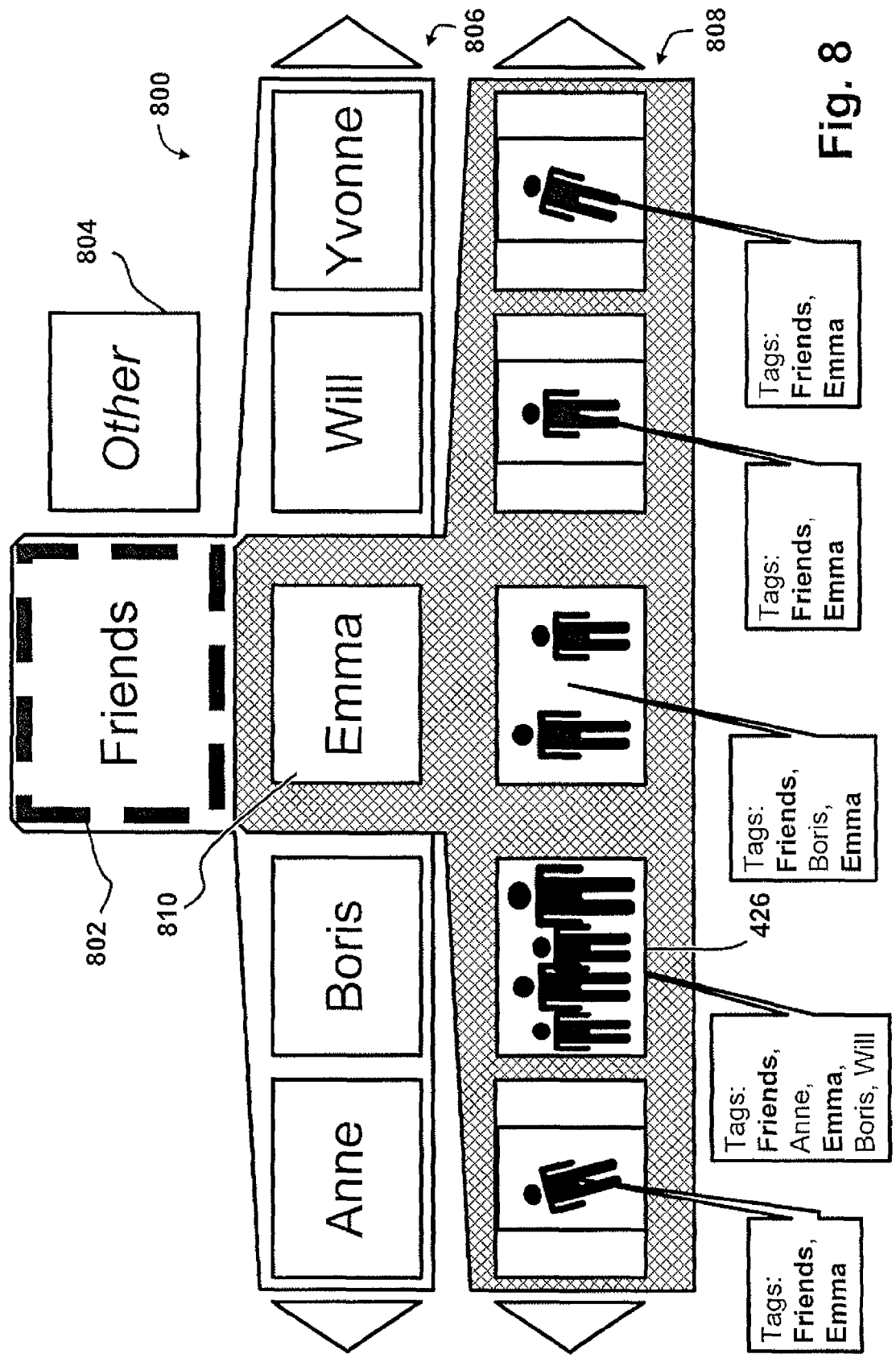
Figure 9:
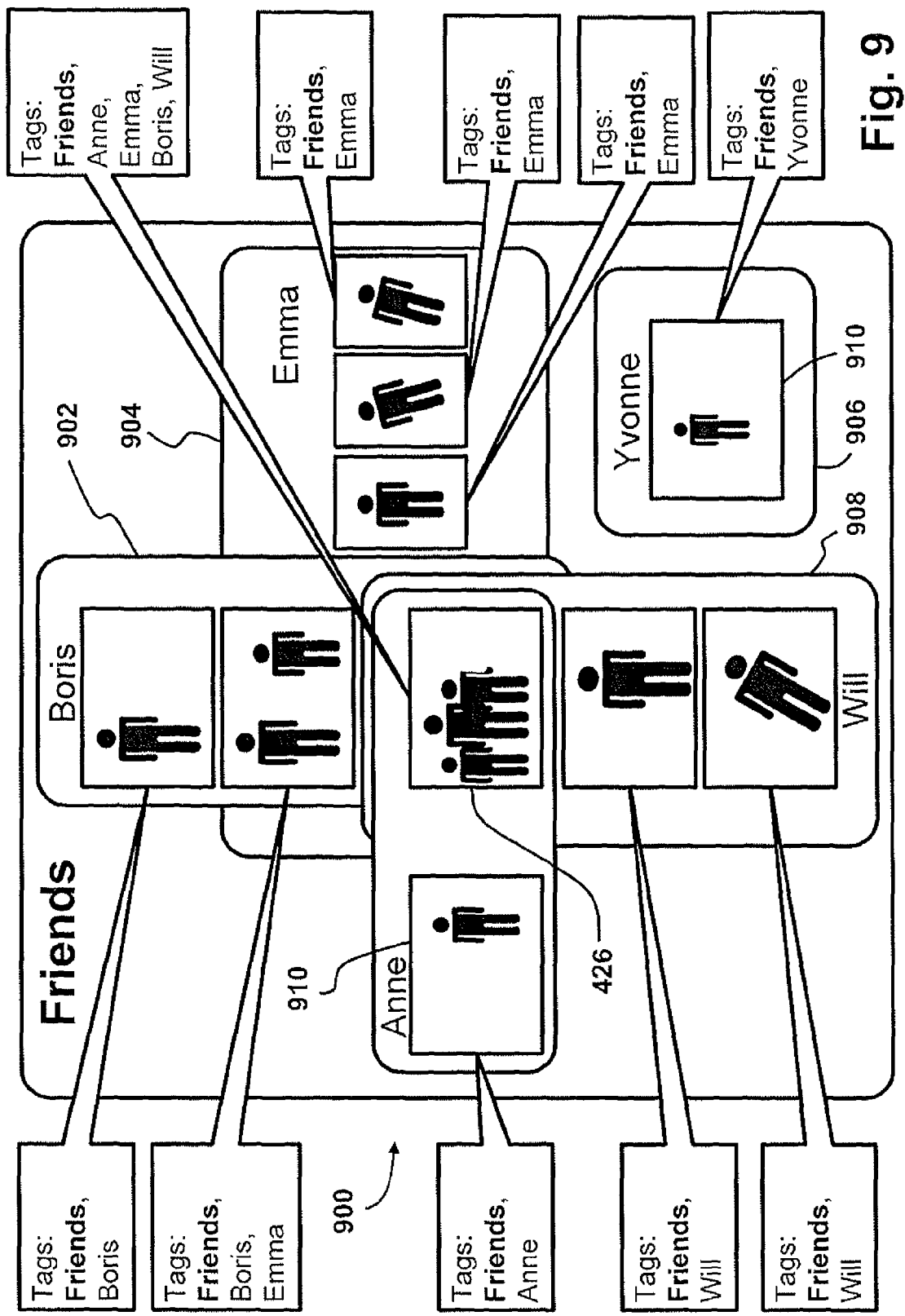
Figure 10:
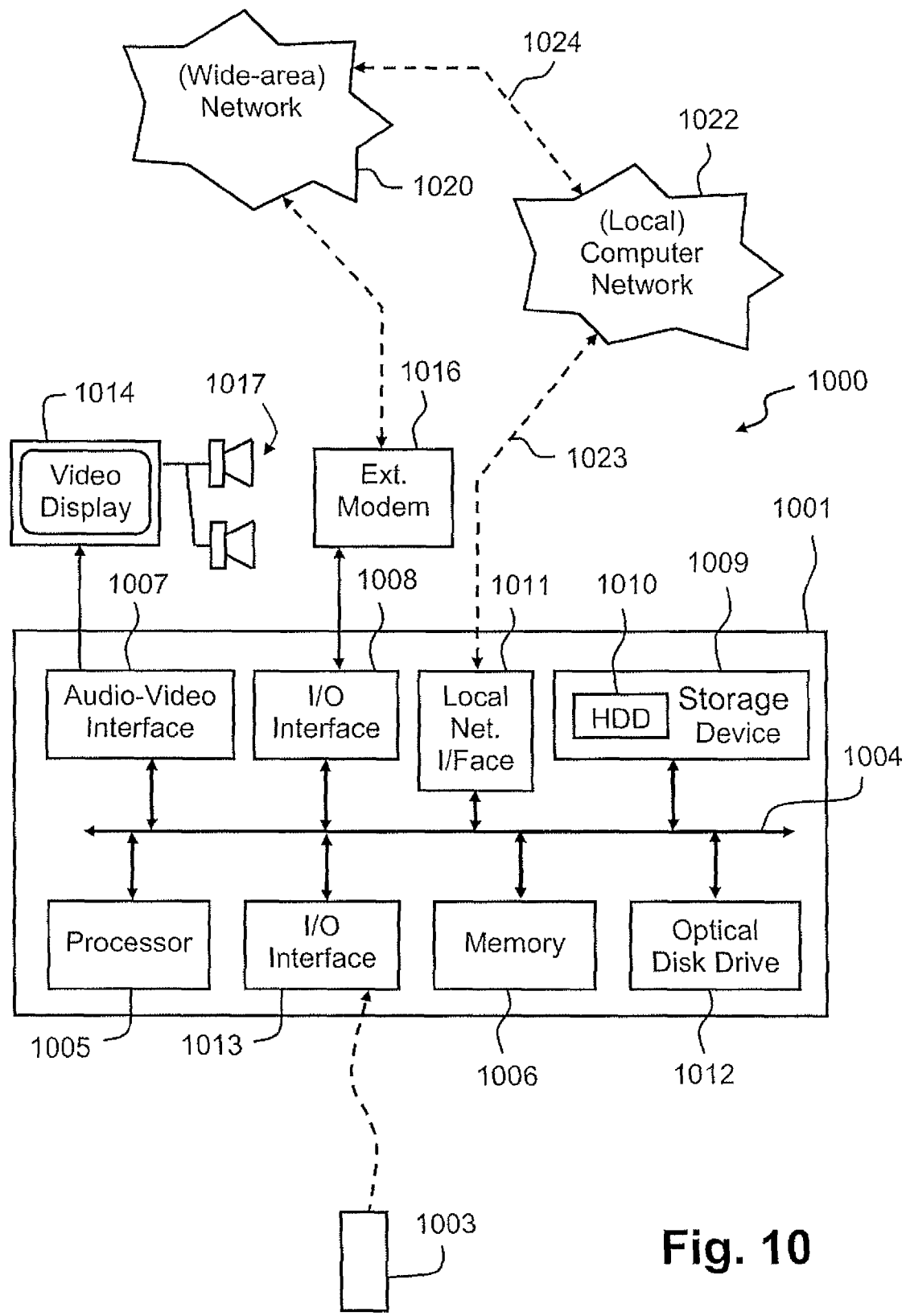
FIG. 10 is a schematic block diagram representation of a system in which the various methods described may be implemented.

The methods to be described may be implemented using a computer system 1000, such as that shown in FIG. 10 wherein the processes of FIGS. 1 to 9 may be implemented as software, such as one or more application programs executable within the computer system 1000. In particular, the method steps browsing and tagging items are effected by instructions in the software that are carried out within the computer system 1000. The instructions may be formed as one or more code modules, each for performing one or more particular tasks. The software may also be divided into two separate parts, in which a first part and the corresponding code modules performs the actual tagging of items and a second part and the corresponding code modules manage a browser user interface between the first part and the user. The software may be stored in a computer readable medium, including the storage devices described below, for example. The software is loaded into the computer system 1000 from the computer readable medium, and then executed by the computer system 1000. A computer readable medium having such software or computer program recorded on it is a computer program product. The use of the computer program product in the computer system 1000 preferably effects an advantageous apparatus for browsing and tagging media items.

As seen in FIG. 10, the computer system 1000 is formed by a computer module 1001, a user operable limited input device 1003, such handheld remote control device, and an output device such as a display device 1014 and associated loudspeakers 1017. The computer module 1001 may for example be formed by a so-called set-top box associated with a television display and the system 1000 may in this regard be arranged in a living room style environment where the processing capacity of the module 1001, the input capacity of the device 1002 and a display capacity of the display 1014 are generally limited. An external Modulator-Demodulator (Modem) transceiver device 1016 may be coupled to the computer module 1001 for communicating to and from a communications network 1020 via a connection 1021. The network 1020 may be a wide-area network (WAN), such as the Internet or a cable TV service WAN. Where the connection 1021 is a telephone line, the modem 1016 may be a traditional "dial-up" modem. Alternatively, where the connection 1021 is a high capacity (eg: cable) connection, the modem 1016 may be a broadband modem. A wireless modem may also be used for wireless connection to the network 1020.

The computer module 1001 typically includes at least one processor unit 1005, and a memory unit 1006 for example formed from semiconductor random access memory (RAM) and read only memory (ROM). The module 1001 also includes a number of input/output (I/O) interfaces including an audio-video interface 1007 that couples to the video display 1014, an I/O interface 1013 for the remote control 1003, and an interface 1008 for the external modem 1016. The interface connection to the remote control may be wired, or wireless such as radio frequency or optical (eg. infra-red). In some implementations, the modem 1016 may be incorporated within the computer module 1001, for example within the interface 1008. The computer module 1001 is also shown as having an optional local network interface 1011 which, via a connection 1023, permits coupling of the computer system 1000 to a local computer network 1022, known as a Local Area Network (LAN). As also illustrated, the local network 1022 may also couple to the wide network 1020 via a connection 1024, which would typically include a so-called "firewall" device or similar functionality. The interface 1011 may be formed by an Ethernet™ circuit card, a wireless Bluetooth™ or an IEEE 802.11 wireless arrangement.

The interfaces 1008 and 1013 may afford both serial and parallel connectivity, the former sometimes being implemented according to the Universal Serial Bus (USB) standards and having corresponding USB connectors (not illustrated). Storage devices 1009 are provided and typically include a hard disk drive (HDD) 1010. An optical disk drive 1012 may sometimes be provided to act as a non-volatile source of data. Portable memory devices, such optical disks (eg: CD-ROM, DVD), and USB-RAM for example may then be used as appropriate sources of data to the system 1000. Other storage devices include SD cards. Further some devices may include communication arrangements linking to separate storage devices. For example, where the present arrangements are implemented in a camera, a Bluetooth™ wireless may be used to connect the camera to a data store, such as a notebook computer or handheld computer.

The components 1005 to 1013 of the computer module 1001 typically communicate via an interconnected bus 1004 and in a manner which results in a conventional mode of operation of the computer system 1000 known to those in the relevant art. When implemented as a set-top box, the module 1001 will typically have an operating system that is essentially transparent to the user and which is configured to implement essentially a single application of which various sub-applications may be controlled by the user. Where the module 1001 is configured more like a traditional desk top computer, an operating system may execute which is apparent to the user and which enable user control of individual applications. Examples of general purpose desk-top style computers on which the described arrangements can be practised include IBM-PC's and compatibles, Sun Sparcstations, Apple Mac™ or alike computer systems evolved therefrom. In such implementations, the input device 1003 may be formed by a more traditional computer keyboard and an associated mouse pointer device.

Typically, the application programs discussed above are resident on the hard disk drive 1010 and read and controlled in execution by the processor 1005. Intermediate storage of such programs and any data fetched from the networks 1020 and 1022 may be accomplished using the semiconductor memory 1006, possibly in concert with the hard disk drive 1010. In some instances, the application programs may be supplied to the user encoded on one or more CD-ROM and read via the corresponding drive 1012, or alternatively may be read by the user from the networks 1020 or 1022. Still further, the software can also be loaded into the computer system 1000 from other computer readable media. Computer readable storage media refers to any storage medium that participates in providing instructions and/or data to the computer system 1000 for execution and/or processing. Examples of such media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 1001. Examples of computer readable transmission media that may also participate in the provision of instructions and/or data include radio or infra-red transmission channels as well as a network connection to another computer or networked device, and the Internet or Intranets including e-mail transmissions and information recorded on Websites and the like.

The second part of the application programs and the corresponding code modules mentioned above may be executed to implement one or more graphical user interfaces (GUIs) to be rendered or otherwise represented upon the display 1014. Through manipulation of the remote control input device 1003, a user of the system 1000 and the application may manipulate the interface to provide controlling commands and/or input to the applications associated with the GUI(s) for media item browsing and tagging in the manner to be described.

In a typical application, a user may possess a collection of images which may be stored on the HDD 1010, on an optical disk insertable into the drive 1012, or on a desk-top (home) computer (not illustrated) but connect to the LAN 1022. That collection and each of the images therein may therefore be accessed via the system 1000 through execution of a browser application (or simply "a browser") by the processor 1005 and by which the display 1014 provides a visual user interface that may be interpreted by the user and, by manipulation of the remote control 1003, the user can manipulate the interface to scroll, search or otherwise view or reproduce one or more of the media items in the collection. The media items may be static images, moving images (video), audio files, or combinations of these. The collection may be arranged in a basic hierarchical structure, for example into folders arranged in date order. The date ordering may have multiple hierarchical levels, such as day, moth and year. This hierarchical arrangement may be established by metadata associated with each media item, the interpretation of the metadata defining the hierarchical structure of the collection. However, the user, during browsing operations, may wish to create a new hierarchical structure, for example associated with content, rather than date. This is achieved according to the present disclosure by the user manipulation the collection and items therein to add tags to the items to establish the alternate hierarchy. Initially the tag values may be assigned levels via a simple rule such as assigning all tag values to a base hierarchical level (eg. level 1). Alternatively, a more complex rule may be used based on the number of media items which have each tag value.

The rules for creating the hierarchical tag tree are:
(i) each tag value only appears in the tree at its assigned level;
(ii) each tag value on a branch from a higher level tag value is associated with a media item with which the higher level tag value is also associated; and
(iii) tag values may appear more than once at the corresponding level below different higher level tag values.

A method 100 for constructing the tag tree according to these rules is shown in flowchart form in FIGS. 1A and 1B which are described in detail later in this section.

The method 100 creates a tree where a sub-tree, starting at a selected node in the tree, is itself a whole tree that would be created for the sub-set of items which have every tag in the path from the selected node to the root of the tree. In this fashion, the tag values at each level of the tree can be thought of as a series of filters. Indeed, the set of items displayed when a node in the tree is selected is the full set of items filtered in turn by each tag value on the path from the selected node to the root of the tree i.e. the displayed items are those items which have all tag values on that path.

This means that a tag value on a branch below a higher level tag value does not necessarily have a semantic relationship with the higher level tag. At first sight this may seem to be a problem, however the case where there is no semantic relationship still provides a useful function. For example in a collection of photographs, if the tag value "Holiday" is on a lower level than the tag value "Family", selecting the node for "Holiday" below "Family" would display items with both "Family" and "Holiday" tags, such as photographs of family holidays.

To make the tree complete it may be necessary to add nodes which have no tag value, or to put it another way, nodes for "no tag in this level". These nodes allow for the case where items exist which have no tag value in a particular level. In one implementation, these nodes are labelled "Other" when they are displayed in the application.

The user can promote or demote a tag to another level by selecting it and then performing a user input action upon the remote control 1003 which activates promotion or demotion of the tag, such as pressing a predefined button on the control or by activating a menu and then selecting the appropriate entry. Once a tag value has been promoted or demoted, the tree can be completely reconstructed from scratch or, to reduce computation, it may be possible to remove and add nodes to the affected parts of the tree, whilst leaving the rest of the tree unchanged. A method 399 for promoting a tag value and only reconstructing the affected parts of the tree is shown in flowchart form in FIGS. 3A, 3B, 3C and are described in detail later in this section.

An extension to the present disclosure is to allow the user to select and hide or unhide tag values from appearing below a higher level tag value. Items with a hidden tag value are still accessible by selecting the higher level node. These items may also be added to the items accessible via a "no tag in this level" or "Other" node. A threshold may be set on number or percentage of items below which a lower level tag is automatically hidden. The threshold may be tested based on the items associated with the lower level tag and subject to a exceeding of the threshold, the lower level tag may be hidden from visibility (ie. not displayed).

Figure 1A:
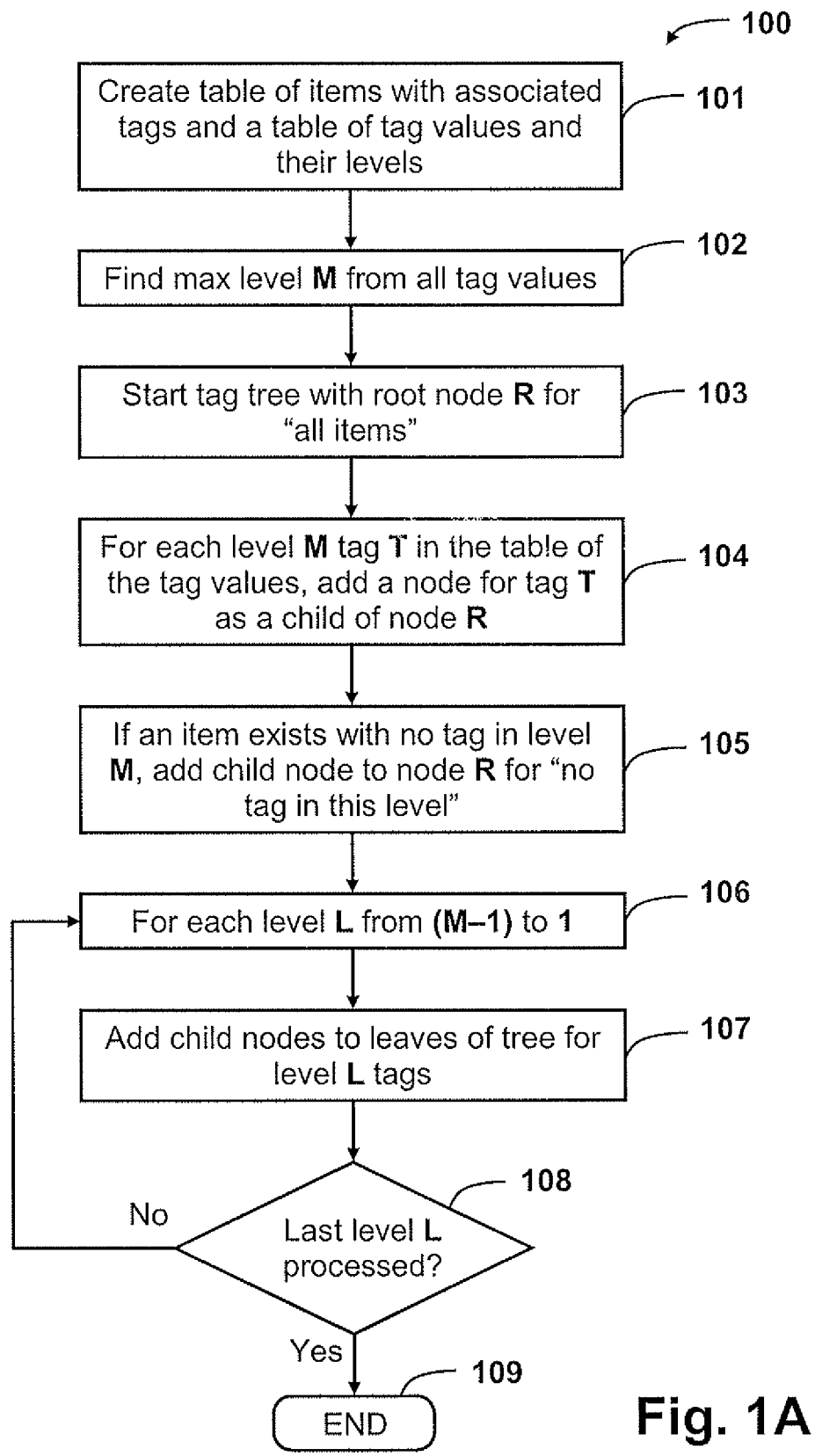
FIG. 1A is a flowchart of a method for construction of a tag tree.

FIG. 1A shows a flowchart of the method 100 to construct the tag tree. The method 100 is preferably executed as an application program within the computer module 1001 in concert with a GUI displayable upon the display 1014. In step 101, a or some other organisational structure of all items in the collection and their associated tags is created together with a table of tag values and the levels to which they are assigned. The tables may be arranged as lookup tables permitting random access into individual entries in any table. The lowest level number used is level 1. Assigning levels may be done automatically or by the user. In step 102 the highest level assigned to any tag value is determined and a variable M is set to this value. In step 103, building of the tag tree is started by creating a root node R which has no tag value because it represents all items in the collection. In step 104 a child node is added to the root node R for each tag value, in the table of tag values, which has level M. Step 105 adds another child node to the root node R if there is any item with no tag at level M. This node is labelled "no tag in this level". Step 106 defines a loop incorporating steps 107 and 108 which operates over each level L from level M−1 down to level 1. In step 107, child nodes are added to the current leaf nodes of the tree for tags at the current level L. Step 107 which is shown in more detail in FIG. 1B. Step 108 checks if level L is the last level and if this is true, the method 100 ends at step 109, otherwise it returns to step 106, where L is decremented to the next level down.

Figure 1B:
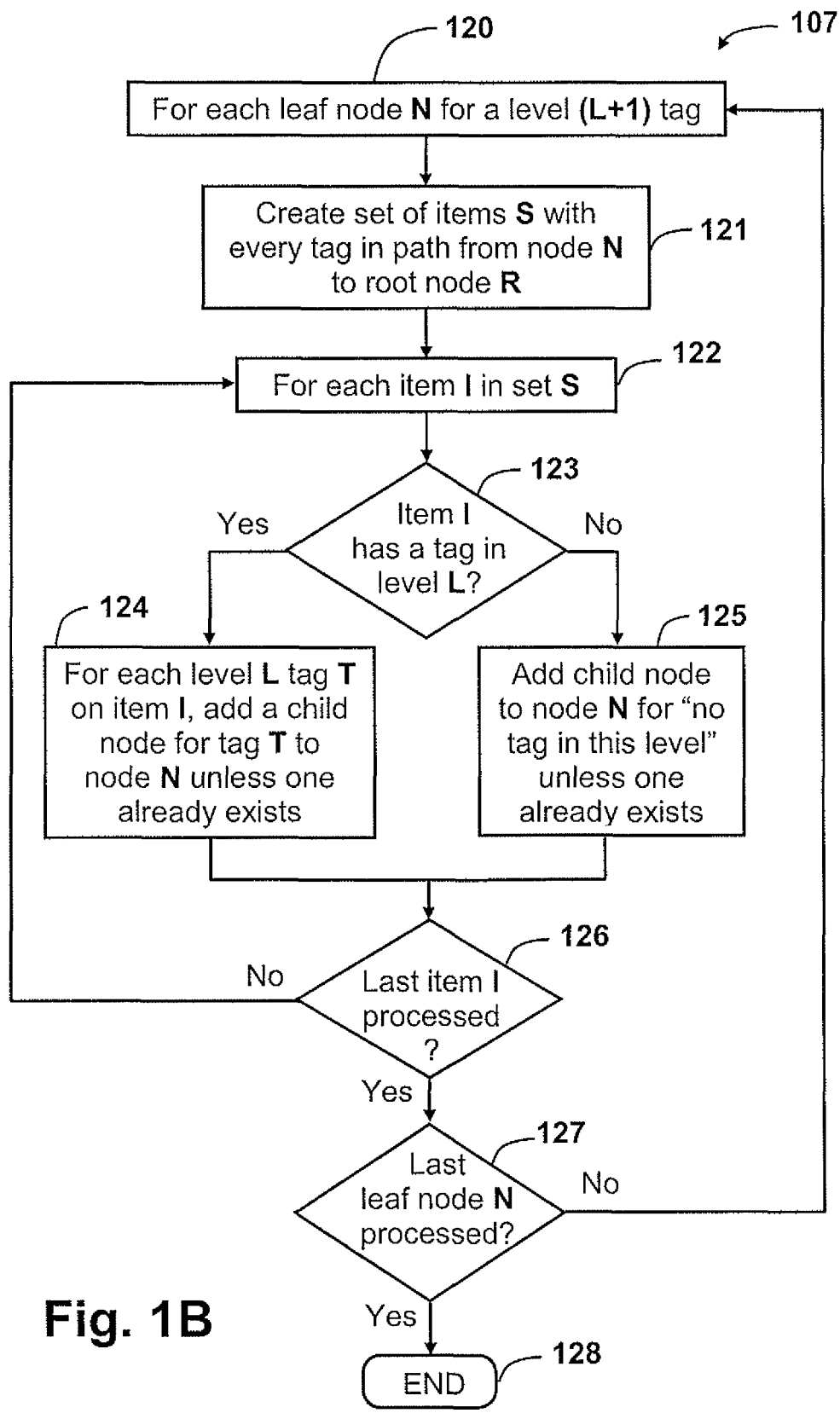
FIG. 1B is a flowchart of a method for step 107 of FIG. 1A.

Step 107 is shown in detail in FIG. 1B and includes steps 120 to 128. Step 120 begins a loop, which ends at step 127, over each leaf node N of the tree at level L+1. In step 121, the table of items created in step 101 is inspected and the set of items, S, that have every tag on the path from node N to the root node R, is determined. Where the path from node N to the root node R includes a "no tag in this level" node, only items which have no tag in that level are included in set S. Step 122 begins a nested loop, which ends at step 126, over each item I in the set of items S. The current item I is inspected in step 123 where it is determined if the current item I has one or more tags in level L. If this is true, step 124 operates to add a child node to node N for each of these tags unless such a node already exists. Otherwise, step 125 operates where a child node is added to node N and is labelled "no tag in this level", unless such a node already exists. Step 126 follows each of steps 124 and 125 and checks if item I is the last item in set S. If this is not true, the method returns to step 122 and another item I is selected, otherwise the method proceeds to step 127 which checks if node N is the last leaf node at level L+1. Note that node N will no longer be a leaf node as it will now have at least one child node. If there is a leaf node remaining, the method returns to step 120 where N is set to the next leaf node, otherwise the method for step 107 ends at step 128.

Figure 2:
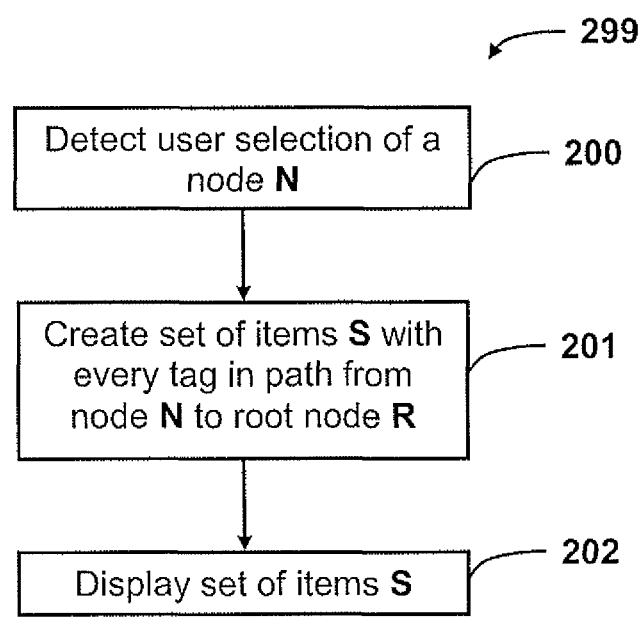
FIG. 2 is a flowchart of a method for determining a set of items to display for a selected hierarchical node.

FIG. 2 shows a method 299 also executable within the computer module 1001 to determine the set of items for display for a selected node upon the display device 1014. Initially, all or part of the hierarchical tree structure is displayed on the display device 1014 within the GUI. The tree structure may be represented in any of the manners found in common file browsing applications, such as a collapsible tree of folders or a set of icons for the current level with an up button, or some other means such as shown in FIGS. 4, 6, 7 and 8. In step 200, the method 299 detects user selection of a node N caused by operation of the remote control 1003. Step 201 inspects the table of items and creates a set of items S, which includes items having every tag on the path from node N to the root node R. The set S is then displayed in step 202 upon the display device 1014 within the GUI. Where the path from node N to the root node R includes a "no tag in this level" node, only items which have no tag in that level are included in the set S.

Figure 3A:
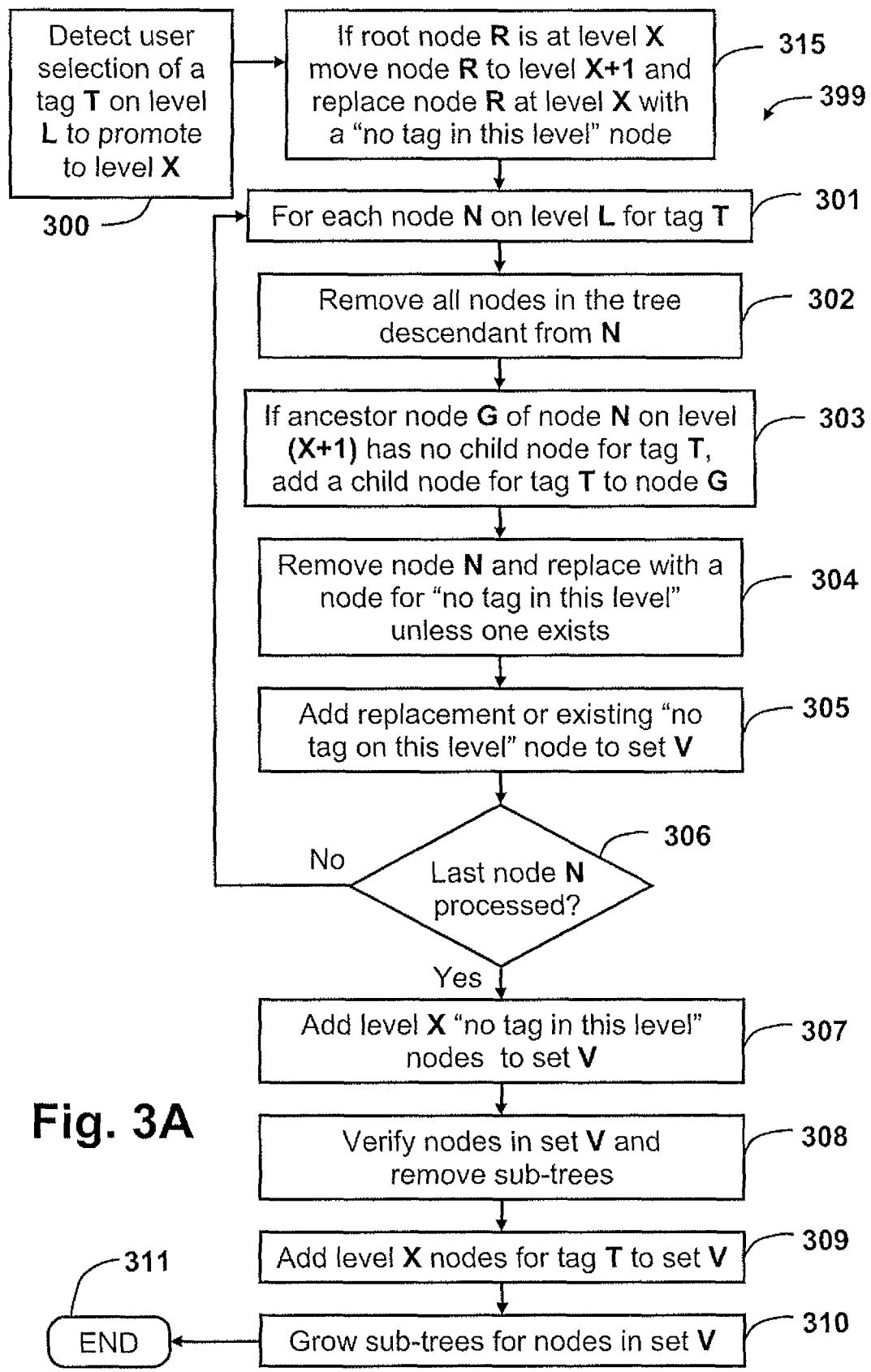
FIG. 3A is a flowchart of a method of promoting a tag value to a higher level.

FIG. 3A shows a method 399 executable as software within the computer module 1001 to promote a tag value to a higher level. Initially in step 300, the method 399 detects a user selection of a tag T on level L for promotion to level X caused by operation of the remote control 1003. In an application with a simple user interface, level X will typically be the level immediately above level L, but the method 399 will also work for higher levels. After step 300, step 315 checks if the root node R is at level X. If this is the case, an extra level is required and so the root node R is moved to level X+1 and a new node for "no tag in this level" is added in level X as a replacement of node R. The new node is a child of node R and a parent of all nodes in level X−1. Next, step 301 begins a loop, which ends at step 306, and which operates over each node N on level L for tag T. In step 302 all nodes in the tree descendent from node N are removed i.e. the sub-trees below node N are removed. In step 303, if the ancestor node G of node N on level X+1 has no child node for tag T, a corresponding child node is added. The ancestor node G is the node on the path from node N to the root node R at level X+1. In step 304 node N is removed and replaced with a node for "no tag in this level", unless the parent of node N already has one such node. In step 305 the "no tag for this level" from step 304 is added to a set V. In step 306, if there still remains a node in level L for tag T, the method 399 returns to step 301 where N is set to the next node on level L for tag T. Otherwise the method 399 continues to step 307. In step 307 all "no tag in this level" nodes in level X are added to the set V. In step 308, the method 399 then removes the sub-trees below the nodes in set V and then verifies that the "no tag in this level" nodes in set V are required, removing such nodes if they are not required. Step 308 is shown in more detail in FIG. 3B. In step 309 nodes for tag T in level X are added to the set V. In step 310 the sub-trees below the nodes in the set V are constructed. Step 310 is shown in more detail in FIG. 3C. Once step 310 is completed, the method 399 ends at step 311.

Figure 3B:
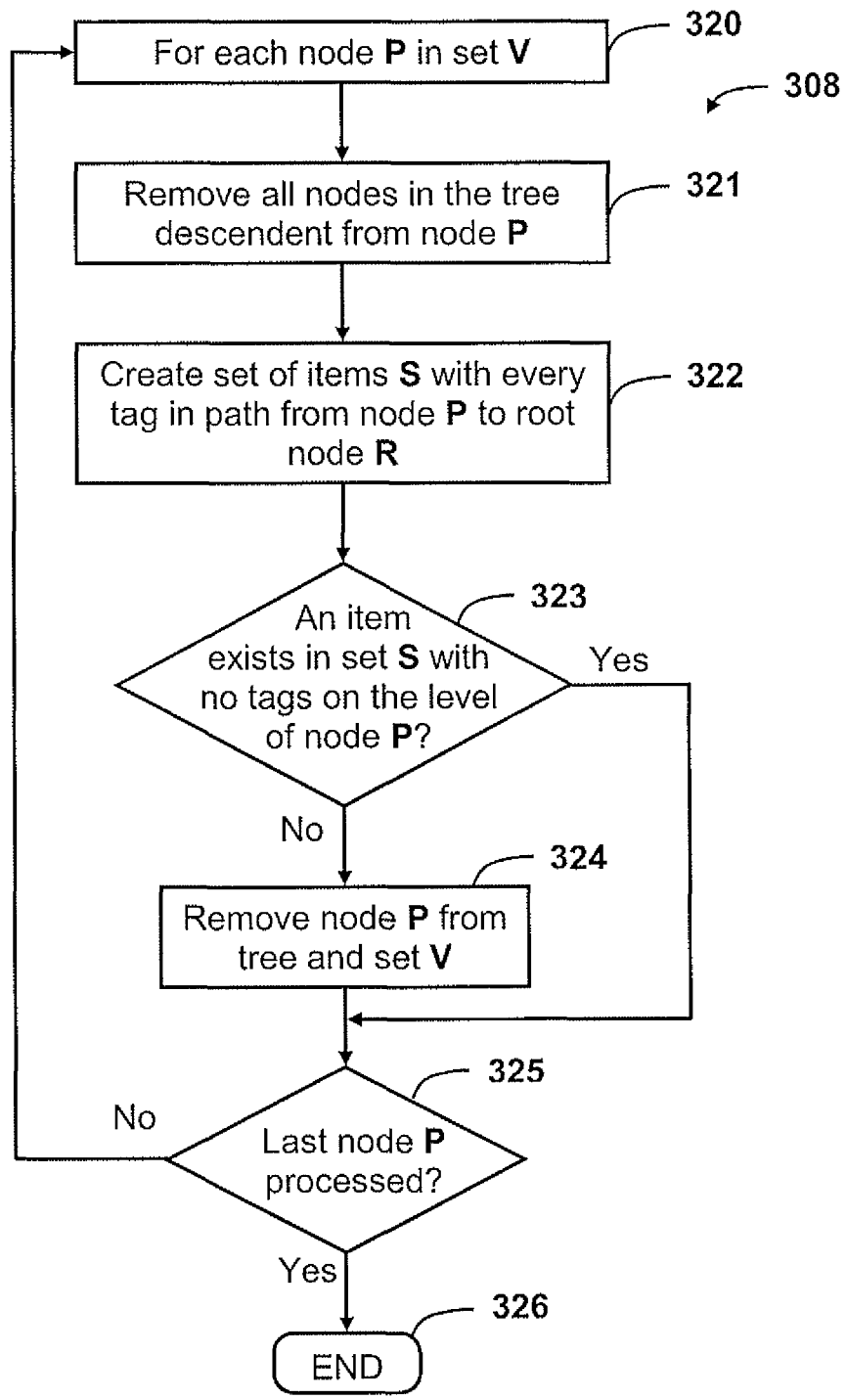
FIG. 3B is a flowchart of a method for step 308 of FIG. 3A.

FIG. 3B shows step 308 in greater detail. Step 320 begins a loop, which ends at step 325, which operates over each node P in the set V. In step 321, all nodes in the tree descendent from node P are removed i.e. the sub-trees below node P are removed. Step 322 inspects the table of items and determines a set of items, S, that have every tag on the path from node P to the root node R. Where the path from node P to the root node R includes a "no tag in this level" node, only items which have no tag in that level are included in the set S. Step 323 checks if an item in the set S exists which has no tags on the level of node N. If this is true, step 324 is skipped, proceeding to step 325, otherwise in step 324 node P is removed from the tree and from set V. Step 325 then checks if the last node P has been processed and if this is not true the method returns to step 320, otherwise the method for step 308 ends at step 326.

Figure 3C:
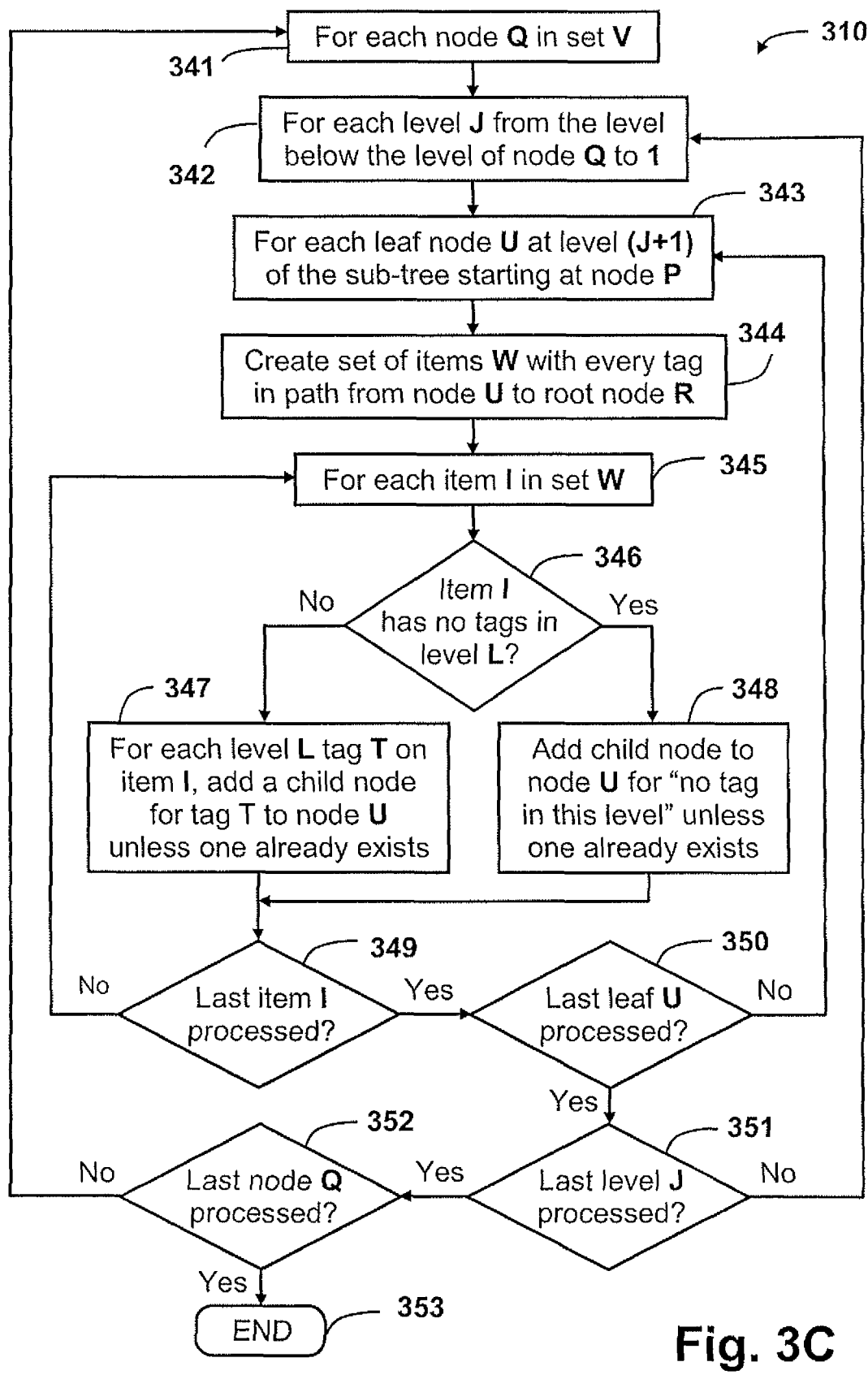
FIG. 3C is a flowchart of method for step 310 of FIG. 3A.

Step 310 is shown in detail in FIG. 3C. Step 341 begins a primary loop, which ends at step 352, and which operates over each node Q in the set V. Step 342 begins a nested loop, which ends at step 351, which operates over each level J from the level below the level of node Q to level 1. Step 343 begins a further nested loop, which ends at step 350, and which operates over each leaf node U in level J+1 in the sub-tree starting at node Q. Node U will be node Q the first time step 343 is executed. Step 344 inspects the table of items and determines a set of items, W, that have every tag on the path from node U to the root node R. Where the path from node U to the root node R includes a "no tag in this level" node, only items which have no tag in that level are included in the set W. Step 345 begins a further nested loop, which ends at step 349, and which operates over each item I in the set W. A current item I is inspected in step 346 to determine if it has no tags in level L. If this is true, step 348 then adds a child node to the node U labelled "no tag in this level", unless such a node already exists. If item I has one or more tags in level L, then step 347 operates to add a child node to node Q for each of these tags, unless such a node already exists. Steps 347 and 348 are each followed by step 349 which checks if there is an item in the set W still to process. If this is true, the method returns to step 345 and I is set to the next item. Otherwise, the method proceeds to step 350 which checks if there remains a leaf node at level J+1 in the sub-tree from node Q to select. Note that node U will no longer be a leaf node as it will now have at least one child node. If there is a leaf node remaining, the method returns to step 343 where node U is set to the next leaf node, otherwise the method continues to step 351. Step 351 checks if this is the last level J and if this is not true the method returns to step 342, otherwise the method proceeds to step 352 which checks if there is an item in the set W still to be processed. If this is true, the method returns to step 341, otherwise the method for step 310 ends at step 353.

The method 399 may be adapted for an initial display of the collection, prior to user input or other directed control. Specifically, the method 399 may be implemented at on initial display to automatically promote of tags which cover a higher percentage of collection. This would mean than on initial display, the user would be presented with the most expansive view of the collection, on a hierarchical tag basis, permitting a better perspective of the structure and perhaps size of the collection. Other metrics to determine the larger portion of the collection may alternatively be used.

Figure 11A:
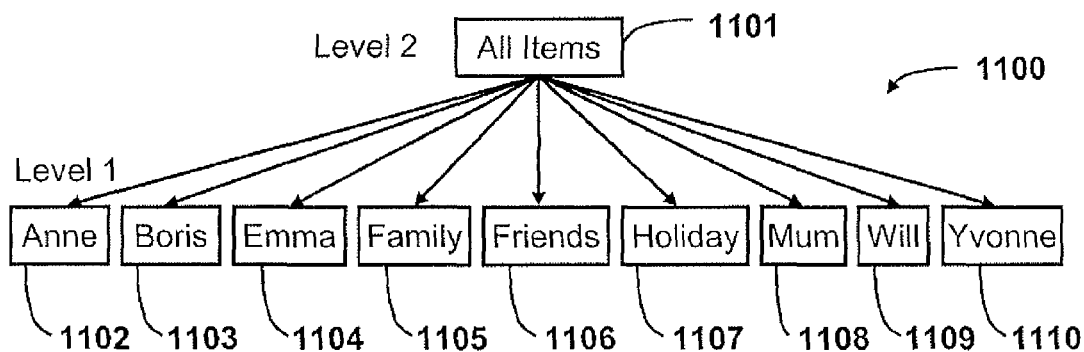
FIG. 11A is an example hierarchical tree structure.

FIG. 11A shows an example hierarchical tree structure 1100 constructed according to method 100, where all tag values have level 1. The tree consists of a root node 1101 at level 2 which represents all items in the collection. The root node 1101 has a number of child nodes 1102-1110 at level 1.

Figure 5:
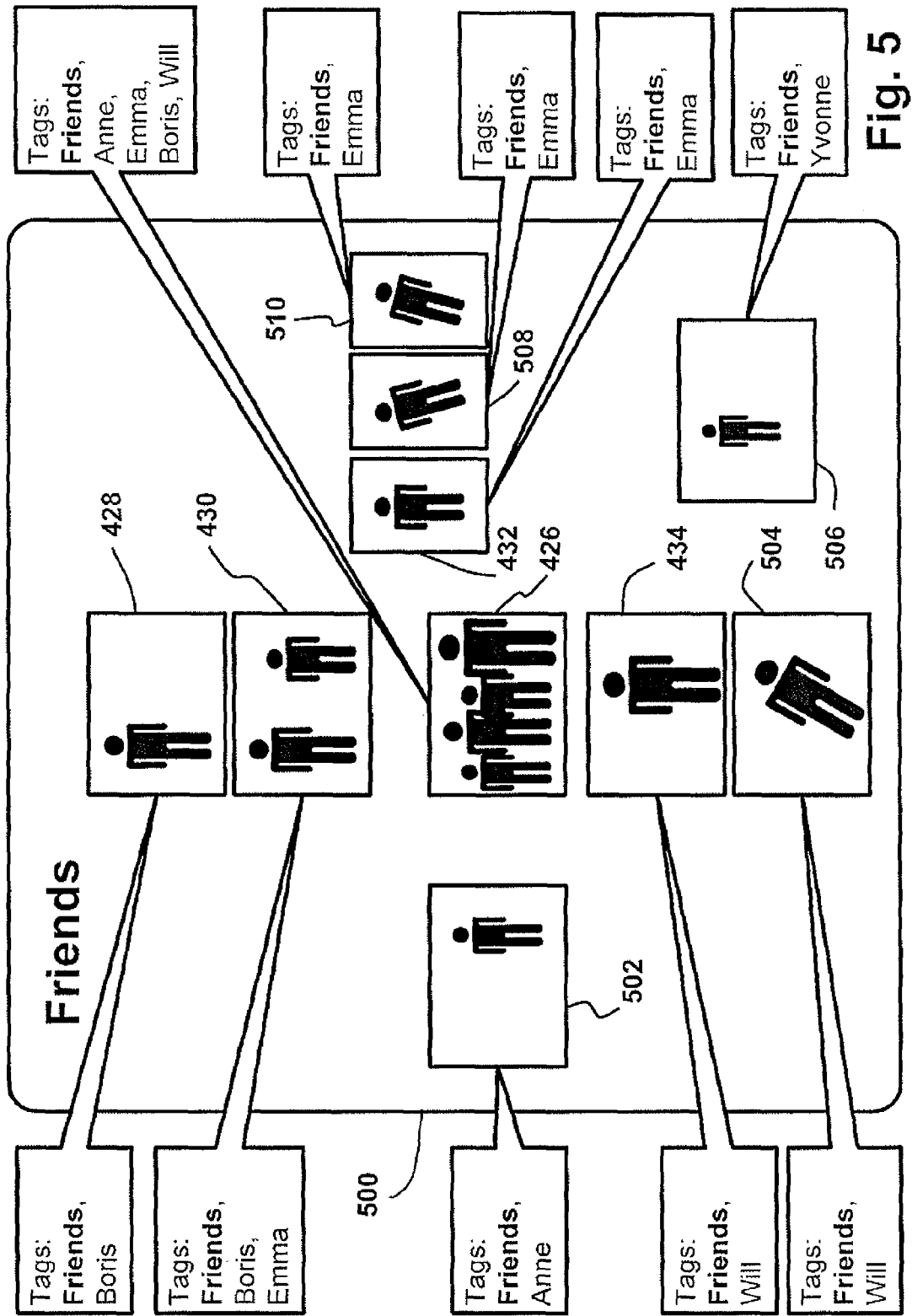
Figure 11B:
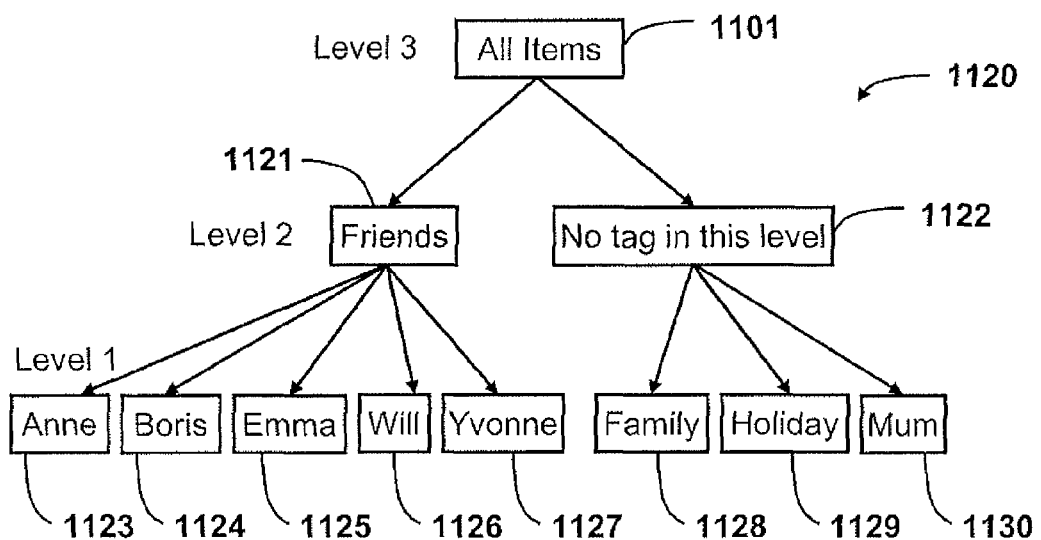
FIG. 11B is a reconstructed hierarchical tree structure following promotion of a tag value in the hierarchical tree structure of FIG. 11A.

FIG. 11B shows the reconstructed hierarchical tree structure following promotion of tag value "Friends", represented by node 1106 in FIG. 11A, to level 2, according to method 399. The root node 1101 has moved to level 3 as per step 315 in method 399. Level 2 now has a node 1121 for tag value "Friends" and a node 1122 for "no tag in this level". Level 1 has nodes 1123-1127 as child nodes of node 1121 for tag value "Friends" and nodes 1128-1130 as child nodes of node 1122 for "no tag in this level". This indicates all items in the collection tagged with "Friends" were also tagged with at least one of Anne, Boris, Emma, Will or Yvonne. FIGS. 5 and 9 illustrate a set of photographs, being the subset of the whole collection with tag value "Friends", which would result in the sub-tree starting at node 1121 as shown in FIG. 11B.

Figure 4:
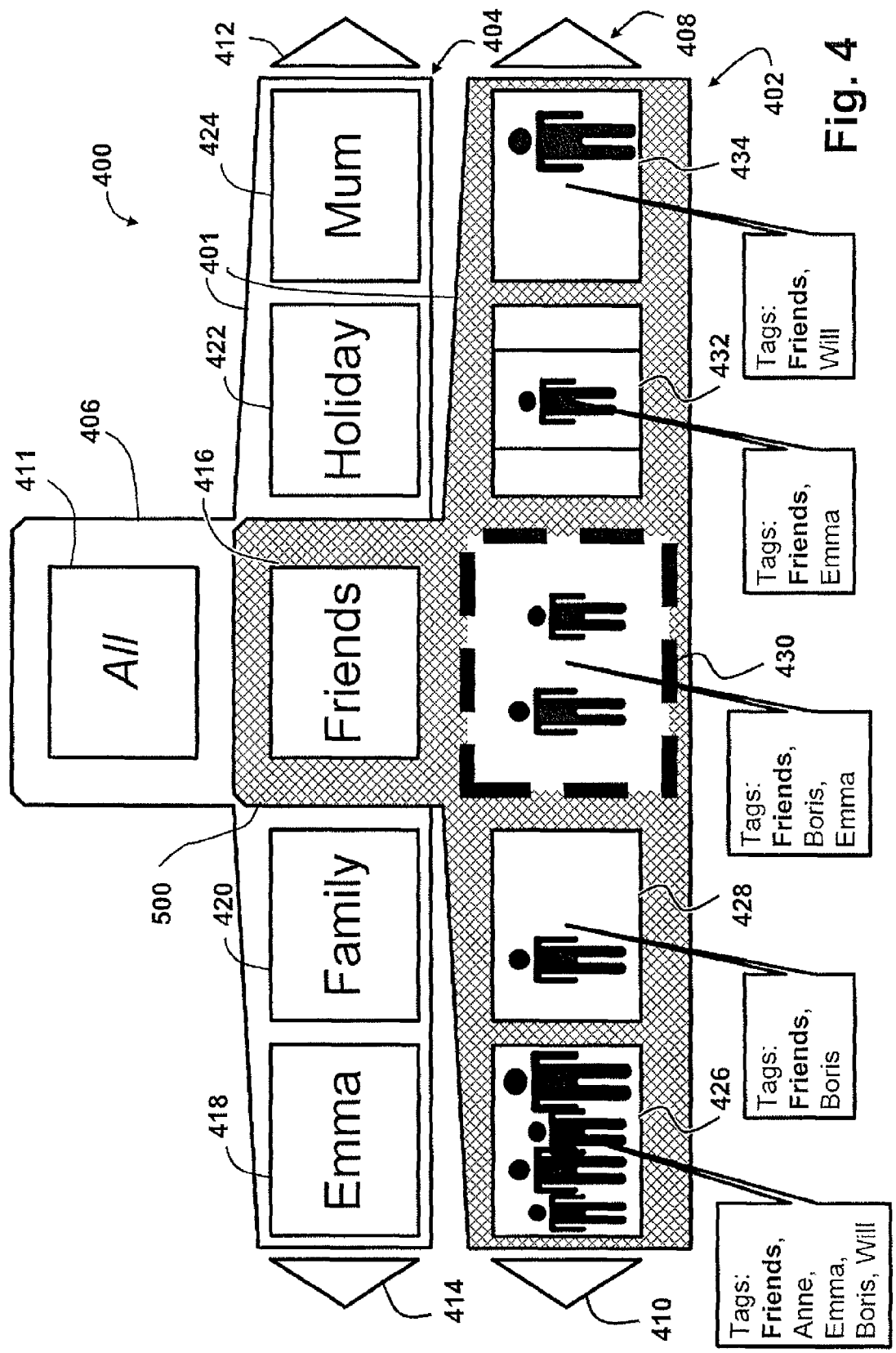
FIGS. 4 to 9 illustrate an example GUI for a media collection and tree changes according to the present disclosure.

FIG. 4 shows an example of a GUI 400 as displayed upon the display device 1014 illustrating a tree structure of tags and photographs 401 representing a collection of photographs. The tree structure 401 has a base level (level 0) 402 populated by individual photographs, a single higher intermediate level (level 1) 404 of nodes and a top level (level 2) 406 containing only a root node (All) 411 of the hierarchy. Each of the levels 402 and 404 has associated therewith scrolling icons 408 and 410, and 412 and 414, respectively, to enable browsing through the collection. As seen, a node labelled "Friends" 416 is selected and photograph items 426-434 under that node are displayed in the base level 402. Other nodes 418-424 are also seen in the intermediate level 404.

Each of the items 426-434 are identified with a number of tags. Each of the items has a tag that is highlighted in bold, being the tag "Friends" corresponding to the node 416 currently selected for display. Other tags for each of the items 426-434 list the particular names of the friends that are depicted in the corresponding photograph. It is observed that a centrally located item 430 in the base level 402 is highlighted as indicated by a dash bold outline. This highlighting may be performed by user selection using the remote control 1003.

FIG. 5 shows the arrangement of individual items under the "Friends" branch 500 of the hierarchical tree 401. It is seen that the branch 500 includes each of the five items depicted in FIG. 4, those being items 428, 430, 426, 434 and 432. Further items are shown illustrated, being items 502, 504, 506, 508 and 510, which are not seen in FIG. 4 due to space limitations in the GUI 400, but which are accessible by scrolling via the icons 408 and 410. Each of the items seen in FIG. 5 is identified by the corresponding tags associated with that photograph. By virtue of the variety of tags (ie: names) associated with each of the photographs in the "Friends" 500 hierarchical branch, it will be appreciated that those photographs can be rearranged in different ways according to the various tags.

Figure 6:
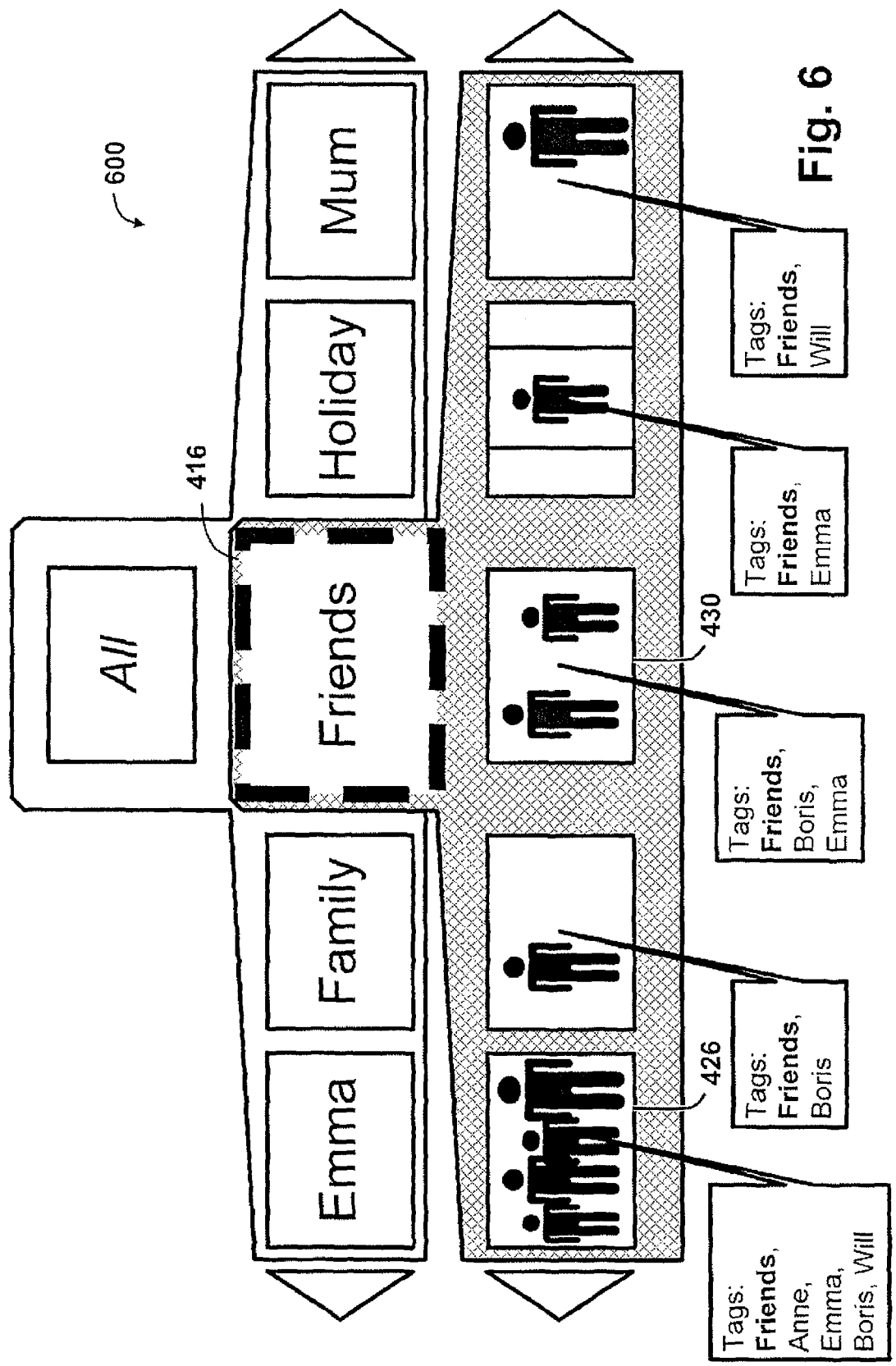

Turning now to FIG. 6, the arrangement of FIG. 4 is replicated however, in this instance, the GUI has changed to a configuration 600 in response to the user scrolling the cursor upwards to a selected position, using the remote control 1003, from the item 430 to highlight the node 416 as indicated.

Figure 7:
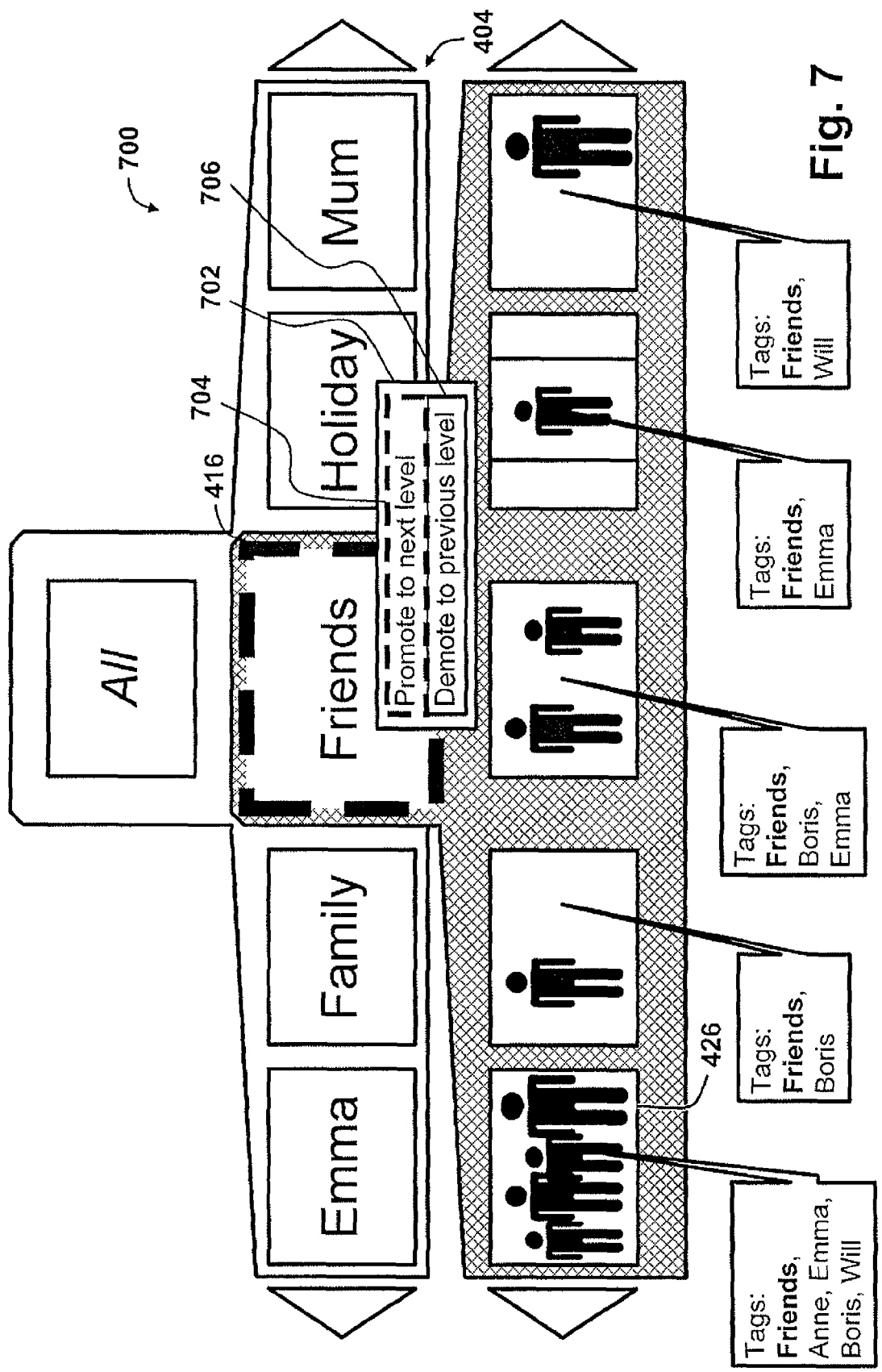

The display of the GUI 600 in FIG. 6 is a precursor to the user choosing to reconfigure the collection and its display based on an alternative hierarchical tag structure. This is seen in FIG. 7 for a changed version 700 of the GUI where, having highlighted the Friends node 416, a selection box 702 appears within the GUI 700 offering two alternatives for user selection. The first alternative is "promote to next level" 704 and the second is "demote to previous level" 706. In this example, the user has selected the alternative 702, as identified by the bolded dashed lines indicating a desire to promote the node 416 up to a position in the next level.

The result of this change is seen in the GUI 800 of FIG. 8 where the Friends node is now seen as the root node 802 and the intermediate level 806 is structured upon the names of individual "Friends". The base level (level 0) 808 again retains photographs in the collection which includes specifically named Friends. It will be appreciated in this regard that not all photographs in the collection will be tagged with "Friends". To accommodate those other photographs, a further node 804 is added to the top level, arranged adjacent to but isolated from the "Friends" node 802, to enable the user to select and view those other photographs in the collection that are not hierarchically structured under the "Friends" node 802, but which otherwise form part of the hierarchical tree structure of the collection represented by all tags.

As further seen in FIG. 8, the intermediate level 806 is centred upon a branch node "Emma" 810 and that the displayed photographs represent those photographs which are tagged with "Emma".

The change from FIGS. 7 to FIG. 8 of the GUI to be focused upon "Emma" may be based upon the fact that the previously highlighted item 430 was one which was tagged with the tag "Emma". Alternatively, the change may well have focused upon "Boris" with which item 430 is also tagged.

FIG. 9 shows the reconstruction of a tree structure 900 based upon a change between FIGS. 7 and 8 whereby the tree structure 900 has a top level node "Friends". The tree structure 900 includes intermediate leaf nodes 902-906 each associated with a specifically named friend tag. It is seen from FIG. 9 that items under the leaf nodes 902, 903, 904 and 905 all intersect upon a single item 426, which is also seen in each of FIGS. 4 to 8. It is further seen that a further leaf node Yvonne 906 has only a single item 910, previously unseen in any of the GUI representations of FIGS. 4 to 8.

It will be appreciated from the above description and the specific example of FIGS. 4 to 9 that a collection of media items, such as but not limited to photographs, can have a number of tags associated with each item and that a relatively simple method for organising and navigating the collection can be performed based upon construction of a hierarchical tree and further through selection of a tag for promotion or demotion resulting in a redefinition or reconstruction of the hierarchical tree structure to afford an alternate view in the graphical user interface. This permits the user, in a simple manner, to define an alternate organisations or representations of the collection for browsing or selection of particular items in the collection.

An extension of the present disclosure provides for automated determination of tag levels. This extension may use a dictionary or predefined word relationships to interpret the relationships between tags to establish a hierarchy. For example, Mum, Dad, Brother, and Sister are all examples of Family. However such are Immediate Family in comparison to Uncle, Aunt, Cousin, Grandmother, Grandfather who are all Related Family. Rules may be established ally such lines. A dictionary may be used to further establish rules for interpreting tags where no user or system define rules are prior established.

The arrangements described offer a number of advantages in navigating collections of tagged items. Some of those advantages include:

1. The tree is automatically organized following promotion/demotion of a tag. As a consequence, the user does not need to establish parent-child relationships between tags.

2. A hierarchy of filters is not necessarily a semantic tag hierarchy. In this regard, tags below a higher level tag may include tags which are not semantically or logically related as well as those that are. This allows the user to narrow their search to unrelated but co-existing tags. For example, below Family there may be Mum and Dad, but there may also be Holiday, browsing under Family/Holiday will show items from family holidays (items must be tagged with both).

3. The disclosed arrangements offer advantages over drag-and-drop managed keyword hierarchy. With this, a hierarchy can be manipulated or formed without a mouse pointer device typically associated with drag-and-drop operations and relatively complex user interfaces. The present arrangements may be performed with a relatively simple user input interface, such as a handheld remote control.

4. The present arrangements offer advantages over so-called "del.icio.us" tag bundles, as known in the art. This is because:

the present arrangements use the same concept of tags at all levels, permitting a lower level tag to be converted into a higher level tag, and vice-versa;

the present arrangements do not require a separate mechanism to create higher level tags/groups;

a del.icio.us user cannot add an item to a bundle by tagging it with the bundle name;

higher level tags are applied to items not tags, bundles are applied to tags. This means items with a lower level tag do not have to have a tag above it in hierarchy. Del.icio.us bundle applies to all items with bundled tags (and thus is similar to advantage 2).

Industrial Applicability

The arrangements described are applicable to the computer and data processing industries and particularly where hierarchical collections of items are to be browsed. Although particularly suited to implementations where the extent of user control over a graphical user interface is somewhat limited, such may also be performed in environments where significantly higher levels of user interaction and control are enabled.

The foregoing describes only some embodiments of the present invention, and modifications and/or changes can be made thereto without departing from the scope and spirit of the invention, the embodiments being illustrative and not restrictive.

I claim:

1. A method of browsing a plurality of media items, at least one of said media items being associated with a plurality of tag values, each tag value having a level, the method comprising the steps of:

(a) constructing a hierarchical tree structure having a root node and tag values arranged at nodes according to the levels of the tag values, such that any tag value on any branch of the tree structure from a first tag value is associated with a media item with which said first tag value is associated;

(b) displaying at least a first portion of the constructed tree structure in a graphical user interface;

(c) promoting, in response to a user input, a level of a second tag value in the displayed portion and, in response to the promoting step, for each node in the level of the second tag value:

(i) removing, in response to said promoting step, at least one node in the tree structure descendant from the node;

(ii) adding a child node for the second tag value to an ancestor node of the node, in a case where the ancestor node of the node does not have the child node for the second tag value;

(iii) replacing the node with a replacement node; and (iv) for each node removed in response to the user input to promote the level of the second tag value, inspecting the removed node and executing at least one of the following steps to create a reconstructed tree structure:

(iv-a) if a path from the removed node to the root node does not have a tag value in the level of the second tag value before the promotion, adding the removed node as a child node to the replacement node; and (iv-b) if the path from the removed node to the root node has a third tag value in the level of the second tag value before the promotion, such that the second tag value is associated with a media item with which said third tag value is associated, adding the removed node as a child node of the node with the second tag value, wherein the reconstructed tree structure is created such that associations of the plurality of tag values with the plurality of media items remain after the reconstructed tree structure is created; and the method further comprising:

(d) displaying at least a second portion of the reconstructed tree structure in the graphical user interface.

2. A method according to claim 1, wherein items displayed for a selected position in the tree structure have the tag value for said selected position in the tree structure and all tag values in the path to the root of the tree structure from said selected position.

3. A method according to claim 2, wherein items are displayed in the tree structure by a node indicating no tag at the particular level.

4. A method according to claim 3, wherein the no tag at the particular level node is isolated in the tree structure representation from other nodes hierarchically connected in the structure.

5. A method according to claim 1, further comprising, in response to a user input, one of hiding or un-hiding a tag from display below a higher level tag, such that media items with such a hidden tag remain visible below the higher level tag but are not visible under the hidden tag.

6. A method according to claim 5, further comprising testing a threshold set on a number or percentage of items below which a lower level tag is automatically hidden, and hiding the lower level tag when such threshold is exceeded.

7. A method according to claim 1, further comprising automatic promotion of tags which cover a larger portion percentage of a collection.

8. A method according to claim 1, further comprising using at least one of a dictionary and pre-defined word relationships to aid automatic determination of tag levels.

9. A method of browsing a plurality of media items, at least one of said media items being associated with a plurality of tag values, each tag value having a level, the method comprising the steps of:
   (a) constructing an organizational structure of tag values, such that where a media item is associated with each of a first tag value and a second tag value, and said first tag value has a higher level than said second tag value, a relationship is created in the organizational structure between said first tag value and said second tag value;
   (b) displaying at least a first portion of the constructed structure in a graphical user interface;
   (c) changing, in response to a user input, the level of one of the first or the second tag values;
   (d) reconstructing, in response to the user input to change the level of said one of the first or the second tag values, the organizational structure such that a new relationship is created between the first and second tag values, and such that the media item remains associated with each of the first and second tag values, the reconstructing including removing a tag value descendent of the one of the first or second tag values for which the level has changed and adding the removed tag value into the organizational structure subject to a set of rules associated with the tag value for which the level has changed; and
   (e) displaying at least a second portion of the reconstructed structure in the graphical user interface.

10. A method according to claim 9, wherein said organizational structure is a tree structure and said new relationship is a tree branch.

11. A method according to claim 9, wherein said organizational structure is a set of lookup tables and said new relationship is defined in the lookup tables.

12. A non-transitory computer readable storage medium having a computer program recorded thereon, the program being executable by a computer device to browse a plurality of media items, at least one of said media items being associated with a plurality of tag values, each tag value having a level, the program comprising:
   code for constructing a hierarchical tree structure having a root node and tag values arranged at nodes according to the levels of the tag values, such that any tag value on any branch of the tree structure from a first tag value is associated with a media item with which said first tag value is associated;
   code for displaying at least a first portion of the constructed tree structure in a graphical user interface;
   code for promoting, in response to a user input, a level of a second tag value in the displayed portion and, in response to the promoting, for each other node in the level of the second tag value:
      (i) removing, in response to the promoting, at least one node in the tree structure descendant from the other node;
      (ii) adding a child node for the second tag value to an ancestor node of the node in a case where the ancestor node of the node does not have the child node for the second tag value; and
      (iii) replacing the node with a replacement node;
      (iv) for each node removed in response to the user input to promote the level of the second tag value, inspecting the removed node and executing at least one of the following steps to create a reconstructed tree structure:
         (iv-a) if a path from the removed node to the root node does not have a tag value in the level of the second tag value before the promotion, adding the removed node as a child node to the replacement node; and
         (iv-b) if the path from the removed node to the root node has a third tag value in the level of the second tag value before the promotion, such that the second tag value is associated with a media item with which said third tag value is associated, adding the removed node as a child node of the node with the second tag value,
      wherein the reconstructed tree structure is created such that associations of the plurality of tag values with the plurality of media items remain after the reconstructed tree structure is created; and further comprising:
   code for displaying at least a second portion of the reconstructed tree structure in the graphical user interface.

13. A non-transitory computer readable storage medium, according to claim 12, wherein items displayed for a selected position in the tree structure have the tag value for said selected position in the tree structure and all tag values in the path to the root of the tree structure from said selected position.

14. A non-transitory computer readable storage medium, according to claim 13, wherein items are displayed in the tree structure by a node indicating no tag at the particular level.

15. A non-transitory computer readable storage medium, according to claim 13, wherein the no tag at the particular level node is isolated in the tree structure representation from other nodes hierarchically connected in the structure.

16. A computer apparatus comprising:
   a memory having a program recorded therein;
   a display device;
   an input device operable by a user; and
   a processor operatively coupled to each of the memory, display device and input device,
   wherein the program is executable by the processor to browse upon the display device a plurality of media items, at least one of said media items being associated with a plurality of tag values, each tag value having a level, such that the execution of the program forms:
   a construction unit configured to construct a hierarchical tree structure having a root node and tag values arranged at nodes according to the levels of the tag values, such that any tag value on any branch of the tree structure from a first tag value is associated with a media item with which said first tag value is associated;
   a first displaying unit configured to display on the display device at least a first portion of the constructed tree structure in a graphical user interface;
   a promoting unit configured to promote, in response to a user operation of the input device, a level of a second tag value in the displayed portion;

a reconstructing unit operative, in response to the promoting, and for each node in the level of the second tag value, to:
- (i) remove, in response to the promoting, at least one node in the tree descendant from the node;
- (ii) add a child node for the second tag value to an ancestor node of the node in a case where the ancestor node of the node does not have the child node for the second tag value;
- (iii) replace the node with a replacement node; and
- (iv) for each removed node, inspect the removed node and execute at least one of the following steps to create a reconstructed tree structure:
  - (iv-a) if a path from the removed node to the root node does not have a tag value in the level of the second tag value before the promotion, add the removed node as a child node to the replacement node; and
  - (iv-b) if the path from the removed node to the root node has a third tag value in the level of the second tag value before the promotion, such that the second tag value is associated with a media item with which said third tag value is associated, add the removed node as a child node of the node with the second tag value, wherein the reconstructed tree structure is created such that associations of the plurality of tag values with the plurality of media items remain after the reconstructed tree structure is created; and the execution of the program further forming:

a second displaying unit configured to display on the display device at least a second portion of the reconstructed tree structure in the graphical user interface.

17. A computer apparatus according to claim 16, wherein items displayed for a selected position in the tree structure have the tag value for said selected position in the tree structure and all tag values in the path to the root of the tree structure from said selected position.

18. A computer apparatus according to claim 17, wherein items are displayed in the tree structure by a node indicating no tag at the particular level and wherein the no tag at the particular level node is isolated in the tree structure representation from other nodes hierarchically connected in the structure.

* * * * *